Nov. 3, 1925.
1,559,627

R. B. LAMBERT

DIRECTION INDICATOR

Filed Oct. 3, 1923
2 Sheets-Sheet 1

INVENTOR
Robert B. Lambert
BY
Arthur L. Slee ATTY

Nov. 3, 1925. 1,559,627
R. B. LAMBERT
DIRECTION INDICATOR
Filed Oct. 3, 1923  2 Sheets-Sheet 2
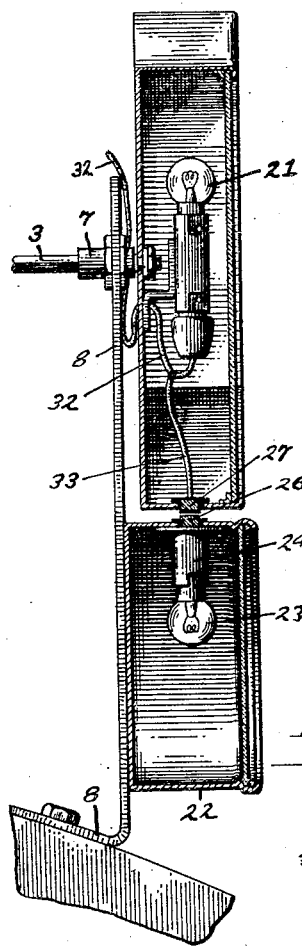
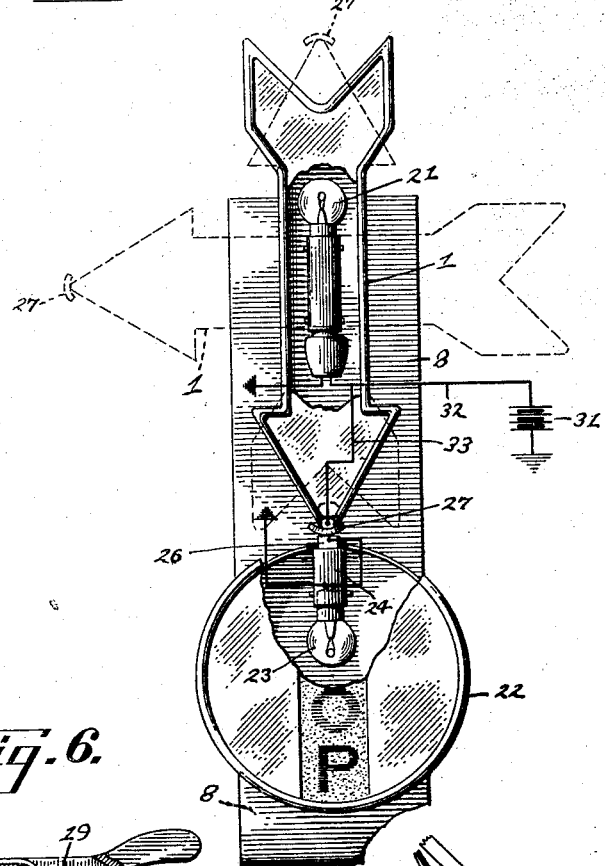
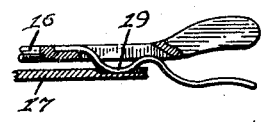
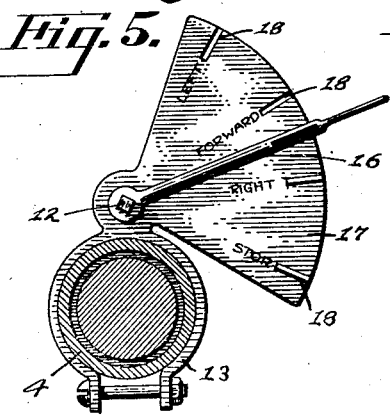
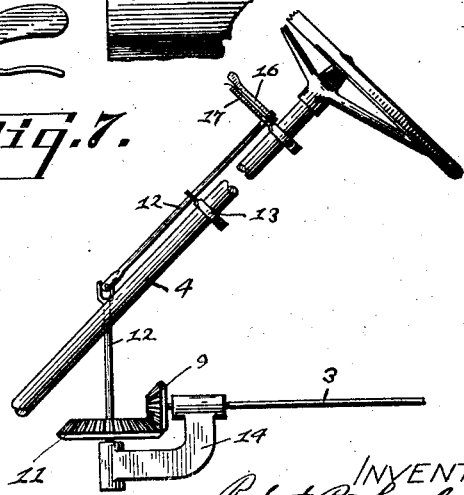
INVENTOR
Robert B. Lambert
BY
ATTY Patented Nov. 3, 1925.

1,559,627

UNITED STATES PATENT OFFICE.

ROBERT B. LAMBERT, OF NAPA, CALIFORNIA.

DIRECTION INDICATOR.

Application filed October 3, 1923. Serial No. 666,355.

*To all whom it may concern:*

Be it known that I, ROBERT B. LAMBERT, a citizen of the United States, residing in Napa, in the county of Napa and State of California, have invented a new and useful Improvement in a Direction Indicator, of which the following is a specification.

My invention relates to improvements in direction indicating devices for automobiles and the like indicating a contemplated turn or stop, wherein a positive signal may be given and maintained until the contemplated action has been completed and the indicator returned to normal posittion.

The primary object of my invention is to provide an improved indicator for signaling a turn or stop.

Another object is to provide an improved device which will at all times operate as a warning signal and which may be manually operated to give a positive indication as to a contemplated turn or stop whereby confusion and misunderstanding may be avoided.

A further object is to provide an improved device of the character described wherein a positive connection is provided between a rotatable pointer and actuating means therefor to insure a correct positioning of the pointer for any movement of the actuating means.

Another object is to provide a device which will automatically illuminate a stop signal when the direction indicating pointer is moved to a stop position.

A further object is to provide an improved device which can be conveniently operated by the driver of the automobile to signal a contemplated action.

A still further object is to provide a device of simple and rugged construction which will present a neat and attractive appearance and which will perform the combined functions of tail light, stop signal, and direction indicator.

I accomplish these and other objects by means of the device disclosed in the drawings forming a part of the present specification wherein like characters of reference are used to designate similar parts throughout said specification and drawings and in which, Fig. 1 is a side elevation of the chassis of an automobile showing the application of my improved direction indicator thereto.

Fig. 3 is a vertical section through the indicator, with the pointer moved to the stop position.

Fig. 4 is a rear elevation of the indicator as shown in Fig. 3, and including a conventional wiring diagram showing one manner in which the electrical connections may be arranged.

Fig. 5 is a transverse section through the steering post, showing the relation of the actuating lever thereto.

Fig. 6 is a broken sectional detail showing the manner in which the actuating lever is held in a desired position.

Fig. 7 is a broken side elevation of the steering post showing the actuating shaft and the manner in which the actuating shaft is connected to drive the main shaft to the indicator.

Figure 1:
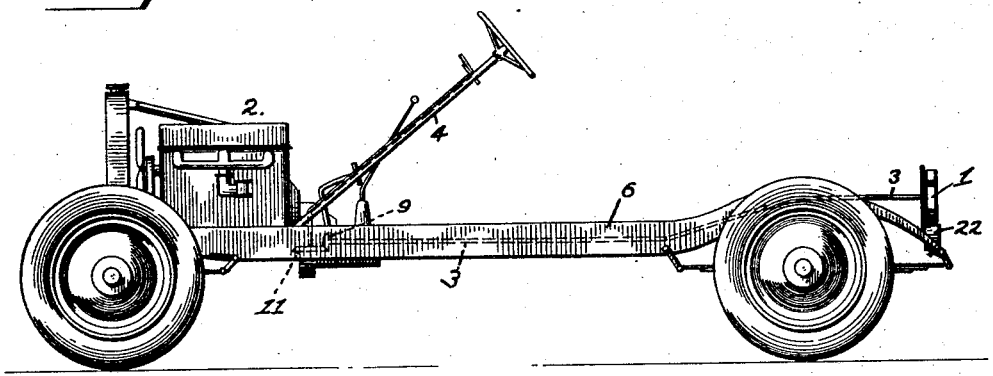
Figure 2:
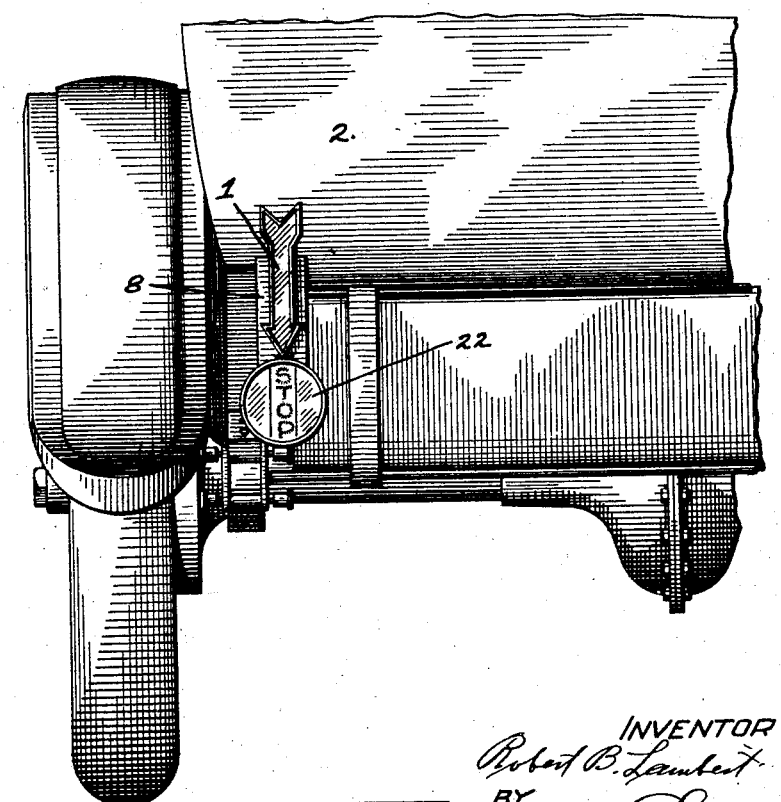
Fig. 2 is a broken rear elevation of an automobile equipped with my device.

Referring to the drawings the numeral 1 is used to designate in general a pointer mounted for rotative movement upon the rear of an automobile indicated in general by the numeral 2. The pointer is secured upon the end of a main shaft 3 from the rear of the automobile to a point adjacent the steering post of the automobile. The main shaft 3 may be made as a solid continuous shaft, or it may be provided with one or more universal joints as may be found necessary to meet the requirements of any particular construction of chassis, the shaft being arranged to follow along the frame 6 under the body of the automobile in any convenient manner.

The end of the shaft 3 is carried by a bearing 7 secured upon a bracket 8 mounted in any convenient manner upon the end of the frame or body of the automobile, the pointer 1 being arranged to rotate adjacent the rearward side of the bracket.

The forward end of the main shaft 3 is provided with a pinion 9 meshing with a gear 11 secured upon the lower end of an actuating shaft 12 mounted adjacent the steering post 4. The upper portion of the actuating shaft is preferably arranged parallel to the steering post and is carried in bearings 13 clamped to said post. The lower portion of the shaft 13 is arranged at an angle to the shaft adapted to obtain a correct relation between the gear 11 and the pinion 9, said lower portion of the shaft being connected to the upper portion by means of a suitable universal joint. The ends of the shafts 3 and 12 are preferably engaged by common bearing member 14 secured upon the frame of the machine and arranged to maintain the gear and pinion in permanent meshing relation.

The upper end of the shaft 12 is squared to receive an actuating lever 16 by which the shafts 12 and 3 may be manually rotated to turn the pointer 1 to a desired position. A fan shaped plate 17 is mounted adjacent the lever 16 and provided with notches 18 adapted to be engaged by a spring latch 19 carried by the actuating lever whereby said lever may be secured in a desired position. The notches 18 are arranged at measured intervals and marked to indicate the position occupied by the pointer when the actuating lever is engaged by each notch. In Figs. 5 and 6 I have illustrated one form of the plate and lever wherein the spring latch, together with the end of the lever, extends outwardly past the edge of the plate 17 whereby the spring and lever may be conveniently gripped and moved to engage a desired notch. The notches 18 are preferably marked "Left," "Forward," "Right," and "Stop," to indicate a contemplated action upon the part of the driver.

The positive and direct connection obtained between the actuating lever 16 and the pointer 1 by means of the gear shafts above described insures an accurate movement of the pointer for each movement of the lever. The pointer is secured upon the end of the shaft 3 in such a manner that when the actuating lever is in engagement with the notch marked "Forward" the pointer will point directly up and will serve to indicate that no change in course is contemplated. The remaining notches are spaced from the "Forward" notch in such a manner that when the lever is moved to the notch marked "Left" the pointer will be turned to point directly to the left and thereby indicate that a turn in that direction is contemplated. In similar manner a movement of the actuating lever 16 to the notch marked "Right" will cause the pointer to assume a horizontal position pointing toward the right. When the lever is moved to the notch marked "Stop," the pointer will be turned until in a vertical position pointing directly down. The lever 16, and hence the pointer 1, is maintained in any desired position by means of the spring latch 19 until moved manually to another position. The pointer may thus be set to a desired position and allowed to remain set until a contemplated action has been entirely completed. In event an accident should occur while a turn is being made, the position of the actuating lever will positively indicate whether or not the proper signal has been made and in this manner assist in determining which party is at fault.

The pointer 1 is preferably made in the shape of an arrow clearly indicating the direction to which it is pointed. The outer side of the pointer is made of transparent red glass or other suitable material adapted to be illuminated by means of an electric lighting element 21 mounted within the pointer. The lighting element is connected in any suitable manner to a source of electrical energy such as the storage battery of the automobile, and is preferably kept lighted at all times when the automobile is in use. The arrow, by being thus illuminated will at all times stand out clearly as a brilliant red warning signal readily seen either in the day time or at night, and will thus serve as the tail light required to be carried by all vehicles.

In order to effectually signal an intention of stopping, and to avoid any possible confusion between the forward and stop positions of the pointer 1, I provide an auxilliary stop signal 22 secured upon the bracket 8 immediately below the pointer. The signal 22 consists of a suitable housing the outer face of which is made of red glass or other suitable material bearing the word "Stop" formed in letters capable of being read at a considerable distance. A lighting element 23 is mounted within the housing by means of a suitable socket 24 secured within the upper portion of the housing, said lighting element being adapted to illuminate the signal, the signal appearing as a bright red disc carrying the word "Stop" when the light is on.

The lighting element 23 within the stop signal is arranged to be illuminated only when the pointer 1 is moved to the "Stop" position as above described. This is accomplished by connecting one terminal of the light to a contact 26 secured upon the upper portion of the housing and insulated therefrom. A corresponding contact 27 is secured upon the point of the pointer 1 and insulated from the body thereof in any suitable manner. The contact is connected to the electric connections between the lighting element 21 of the pointer and the source of energy. The contacts 26 and 27 are so positioned that when the pointer is moved to the stop position with the point directed downwardly the contact 26 will be engaged by the contact 27 and an electric circuit completed therethrough to the lighting element 23.

In Fig. 4 of the drawings I have shown a conventional wiring diagram showing the manner in which the lighting elements may be conveniently connected in what is termed a one wire system, wherein one terminal of a battery 31 is grounded while the opposite terminal is connected to one terminal of the lighting element 21 through a suitable connection 32, the other terminal of said lighting element being grounded. A connection 33 is connected between the connection 32 and the contact 27. The lighting element 23 has one terminal connected to the contact 26 while the other terminal is grounded. Thus when the contacts 26 and 27 are moved into contacting relation as shown in the drawings the circuit from the battery will flow through the connections 32 and 33 to the lighting element 23 and thence back to ground. When the pointer is moved out of the stop position to any of its other operative positions as shown in dotted lines in Fig. 4, the contact 27 will be moved entirely away from the contact 26 so that no electrical connection will be made between the contact 26 and the battery.

From the above description it will be seen that my invention provides a positive warning signal which will be clearly visible to the drivers of approaching vehicles and which may be conveniently and positively moved to a desired position to give a desired signal. In addition, a positive and unmistakable signal is given to indicate a contemplated stop. Furthermore, the positive driving connections and actuating elements are so arranged as to insure a positive and accurate operation of the indicator accomplished with very little effort and without removing the hands from the steering wheel.

While I have shown and described what I now consider to be the preferred form of my invention, it is of course subject to modification in numerous ways to meet the requirements of different makes and types of automobiles and to conform to the laws of different localities. I therefore do not wish to restrict myself to the specific disclosure herein contained but desire to avail myself of all such modifications as may fall within the scope of the appended claims.

Having thus described my invention what I claim as new and desire to secure by Letters Patent is,

1. A direction indicator for automobiles comprising a bracket mounted upon the back of an automobile; a pointer rotatably mounted upon the upper portion of the bracket and adapted to be turned to any of a plurality of direction indicating positions for indicating a contemplated turn or stop; electrical means for illuminating the pointer; a stop signal mounted upon the bracket immediately below the pointer; an electric lighting element mounted within the stop signal; an electric contact mounted upon the top of the stop signal and connected to the lighting element therein; and a contact mounted upon the end of the pointer and electrically connected with a source of electrical energy, said contact being arranged to engage the contact upon the stop signal when the pointer is moved to the stop position and thereby complete a circuit through the lighting element to illuminate the stop signal.

2. A direction indicator for automobiles comprising a bracket mounted upon the back of an automobile; a pointer rotatably mounted upon the upper portion of the bracket, said pointer consisting of an arrow shaped housing having an arrow shaped window facing rearwardly from the automobile; means for moving the pointer to any of a plurality of direction indicating positions whereby the arrow will indicate the contemplated action of a driver; electrical means mounted within the housing for illuminating the window; a stop signal mounted upon the bracket immediately below the pointer; an electric lighting element mounted within the stop signal; an electric contact mounted upon the top of the stop signal and connected to the lighting element therein; and a contact mounted upon the end of the pointer and electrically connected with a source of electrical energy, said contact being arranged to engage the contact upon the stop signal and complete a circuit through the lighting element of said stop signal only when the pointer is moved to a stop indicating position.

In witness whereof I hereunto set my signature.

ROBERT B. LAMBERT.